Aug. 30, 1966 L. VADAS 3,269,279
CARTON ERECTING AND LOADING APPARATUS
Filed Oct. 21, 1963 8 Sheets-Sheet 4
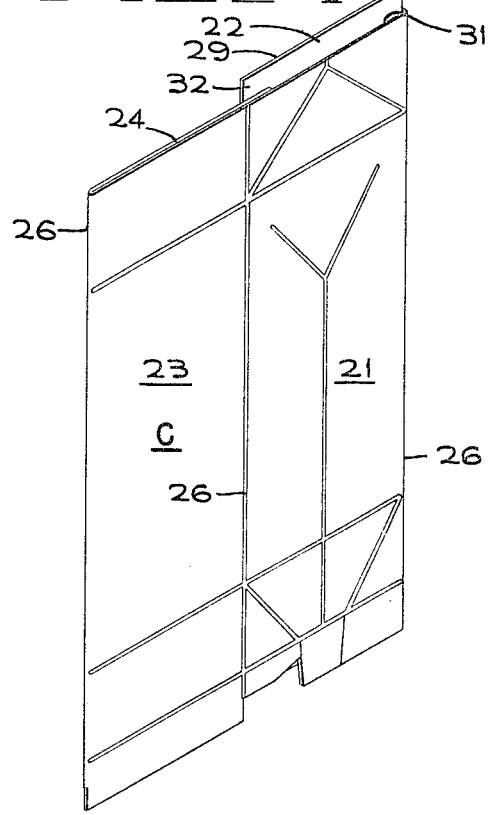
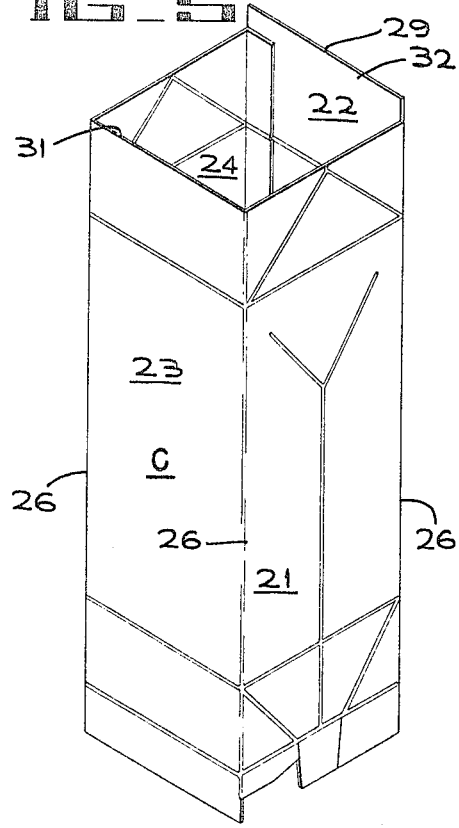
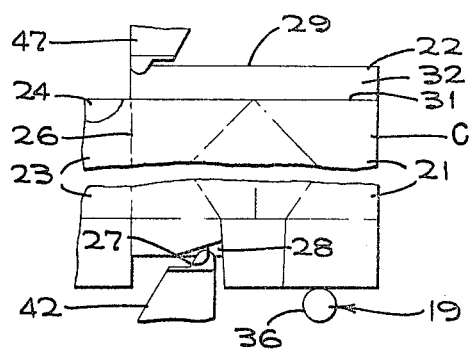
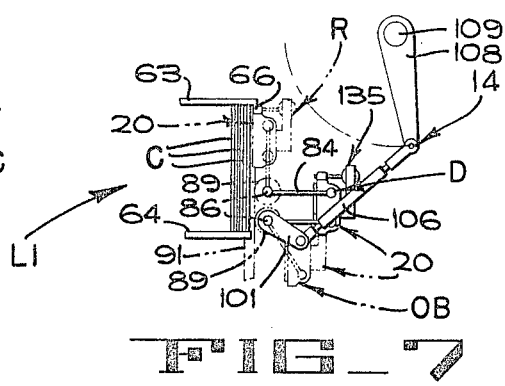
INVENTOR
LESLIE VADAS
BY *Hans G. Hoffmeister*
ATTORNEY

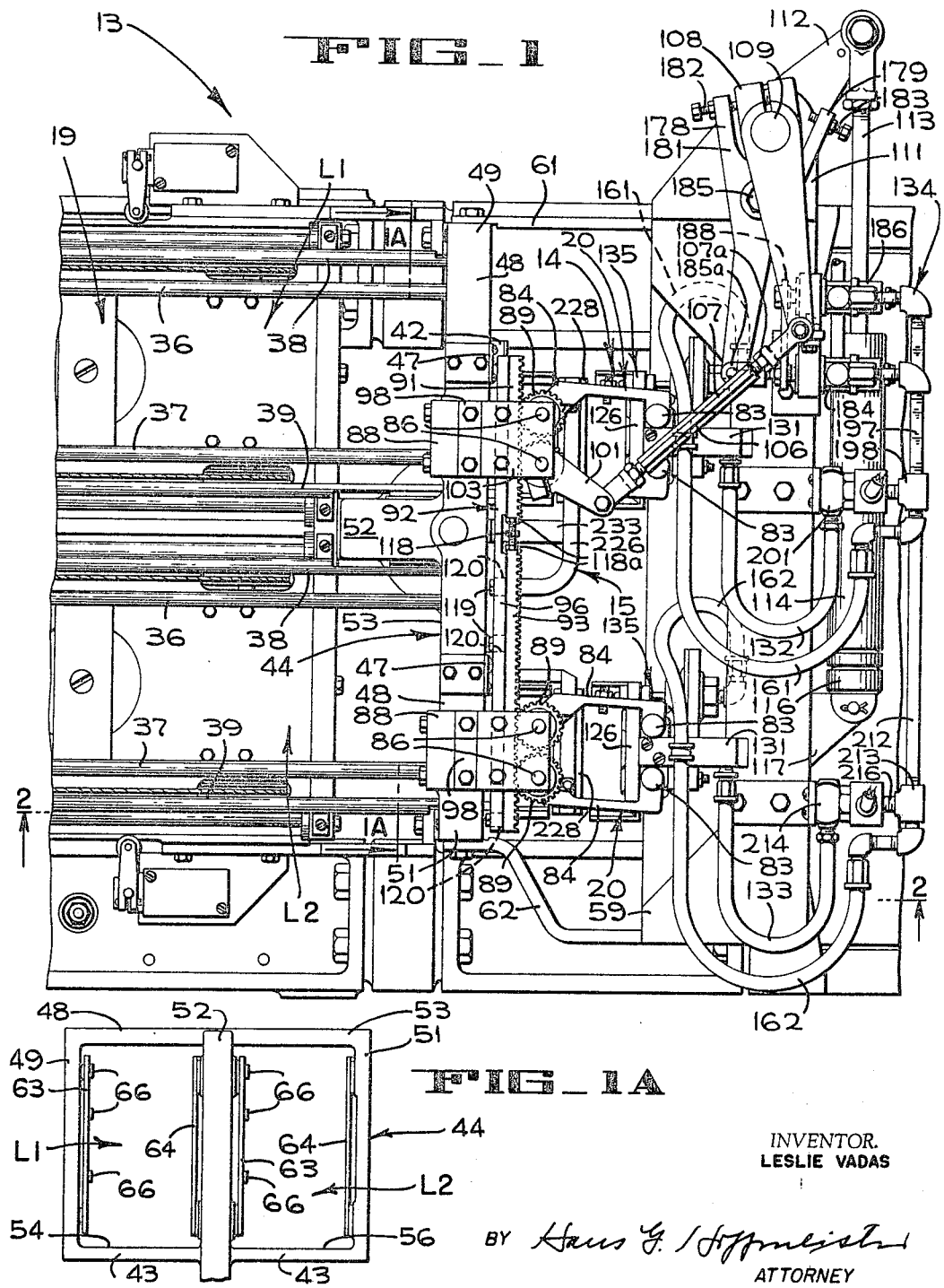

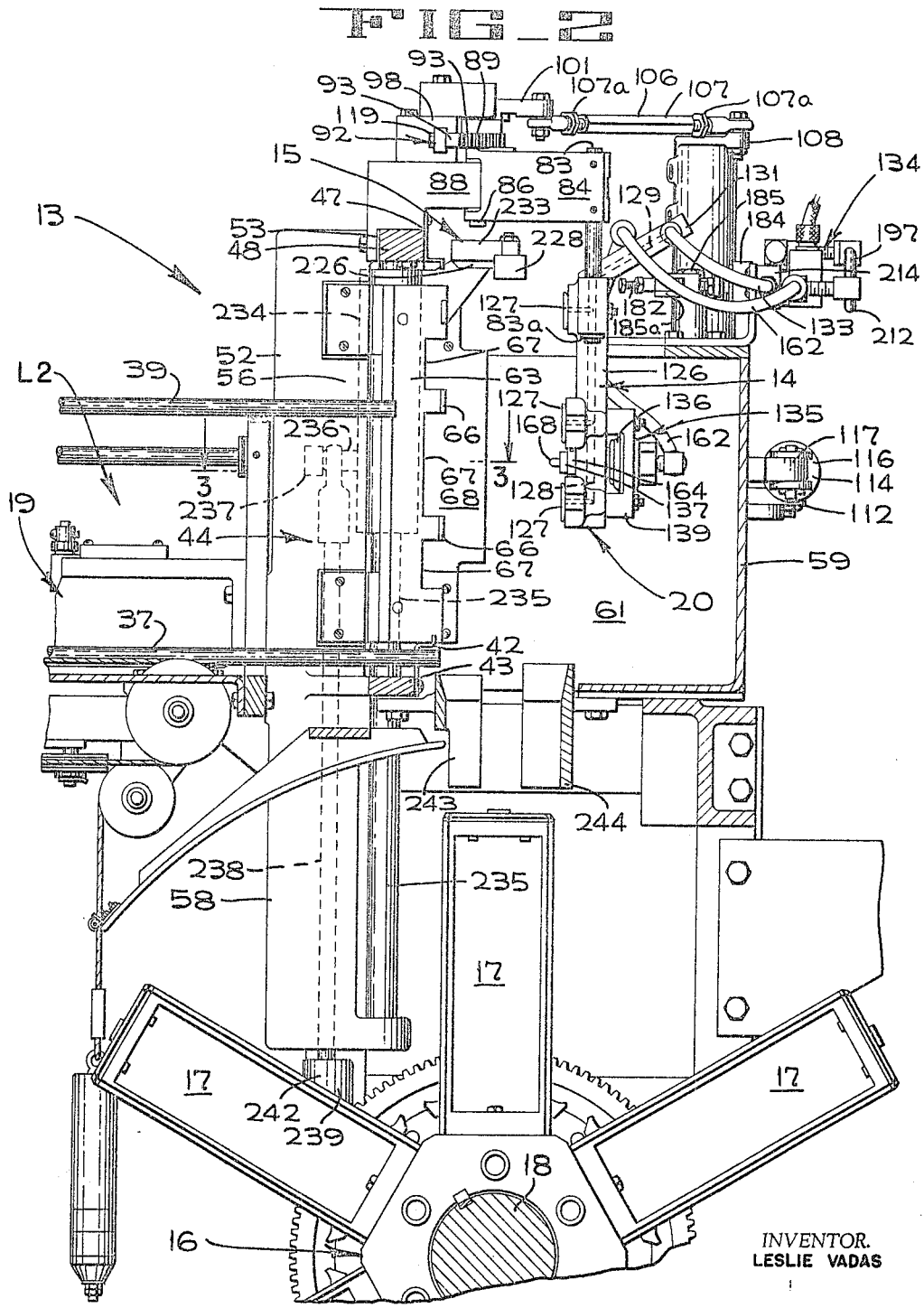

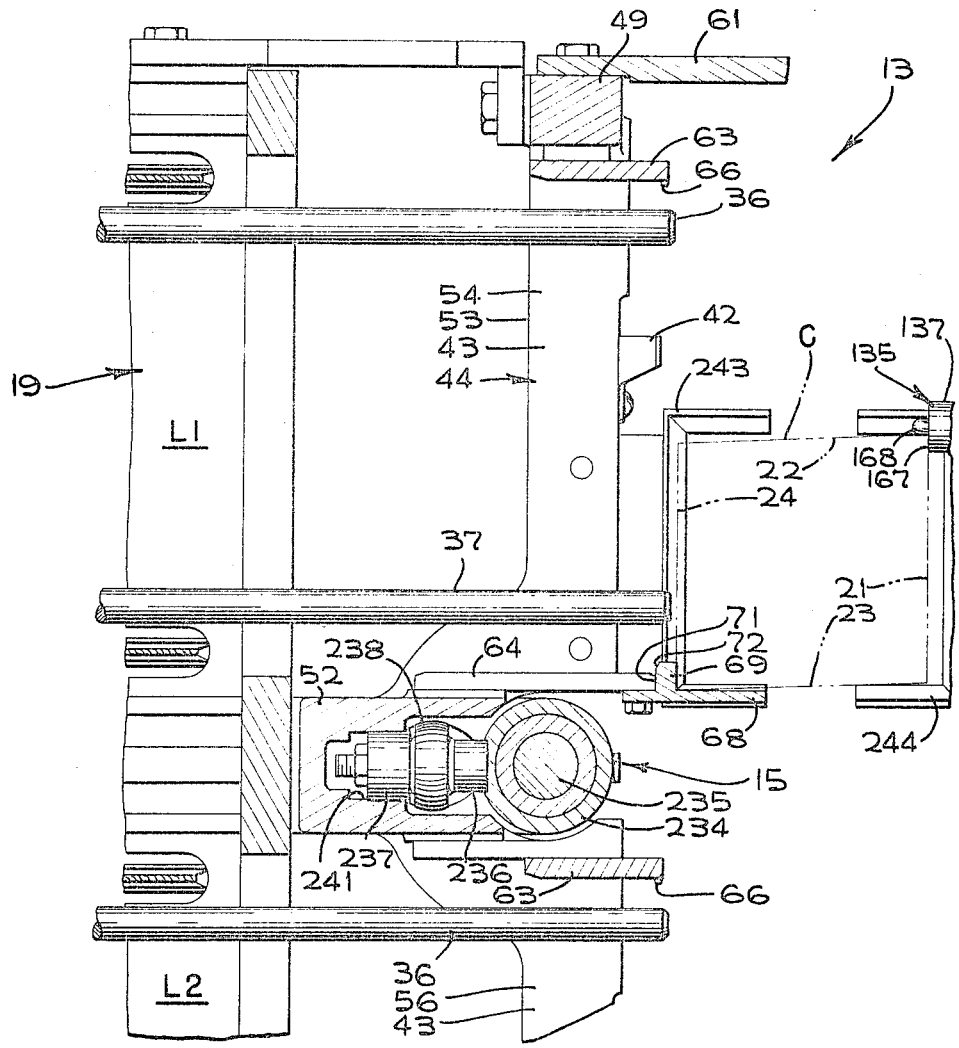

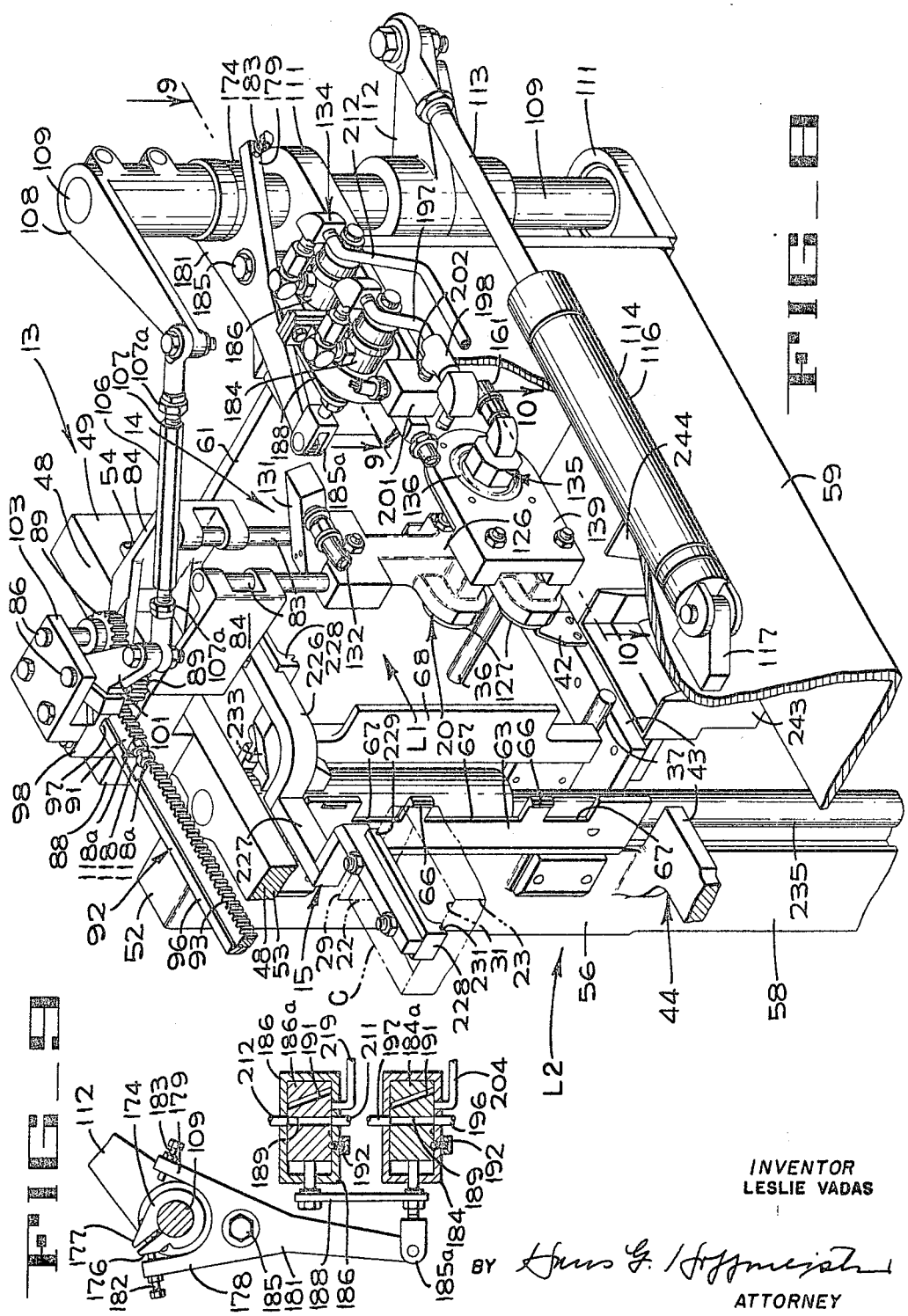

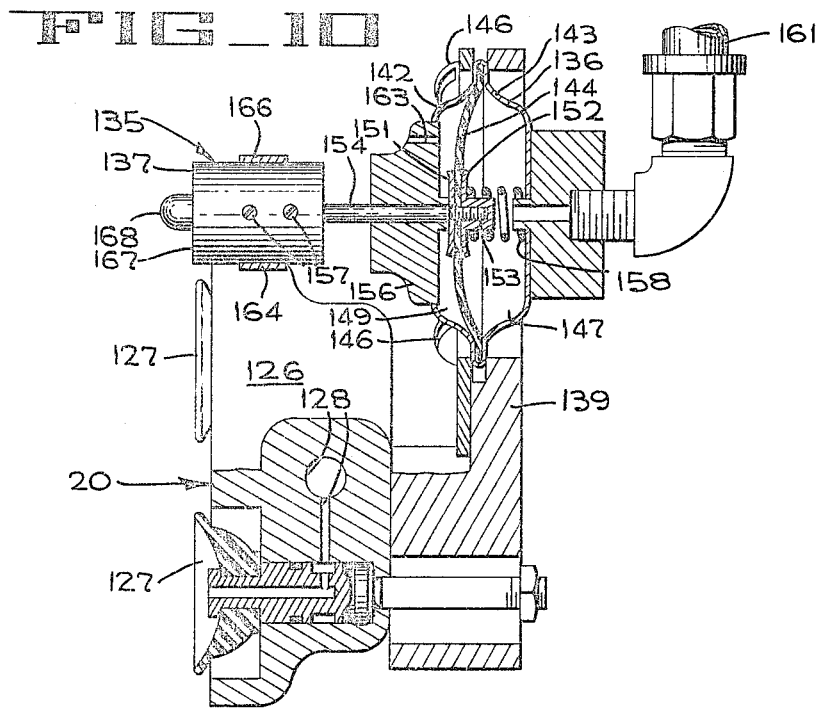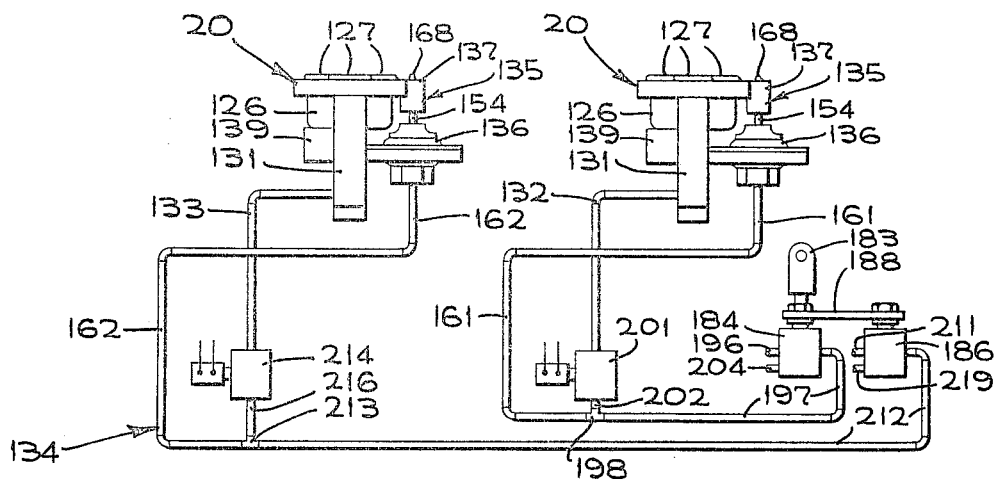

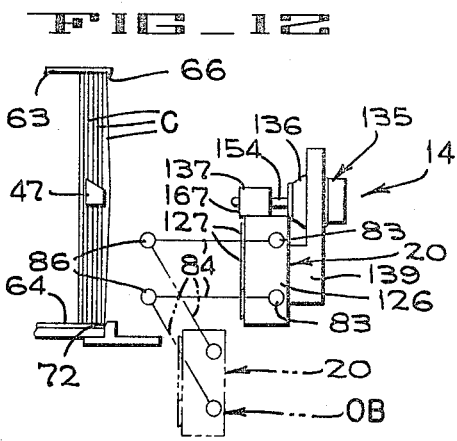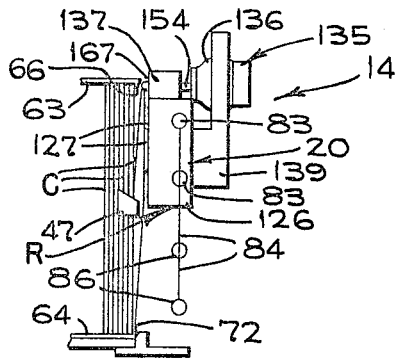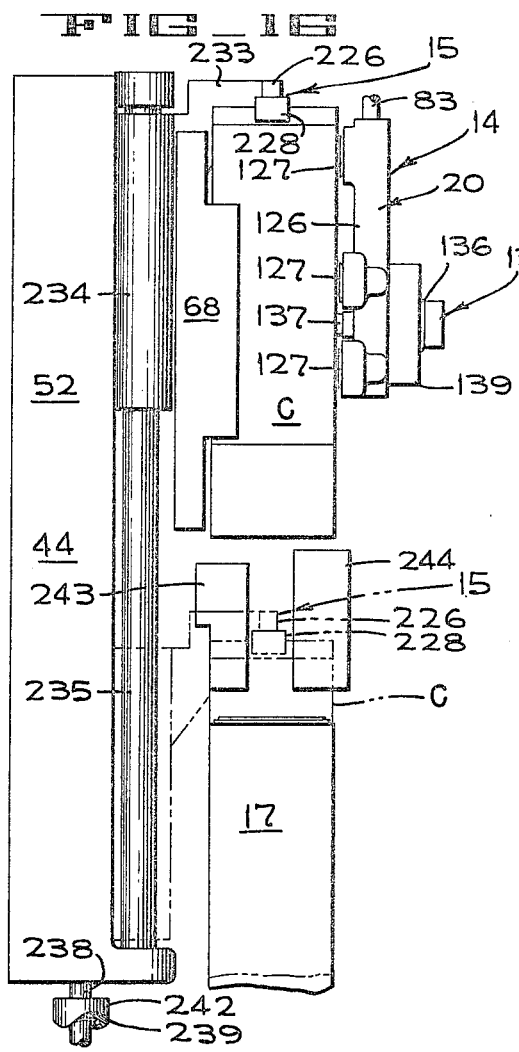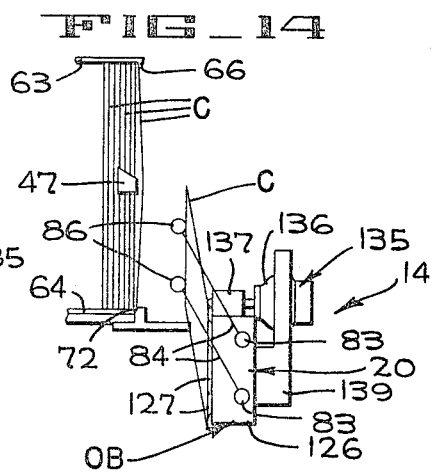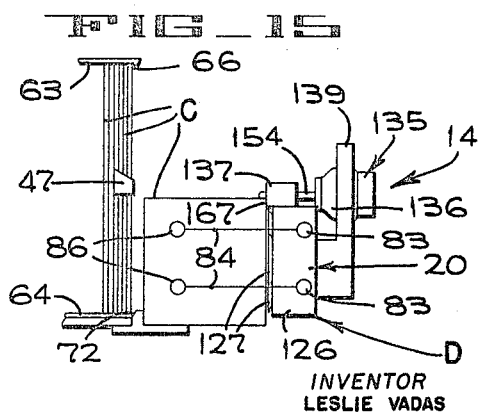

Aug. 30, 1966    L. VADAS    3,269,279
CARTON ERECTING AND LOADING APPARATUS
Filed Oct. 21, 1963    8 Sheets-Sheet 8
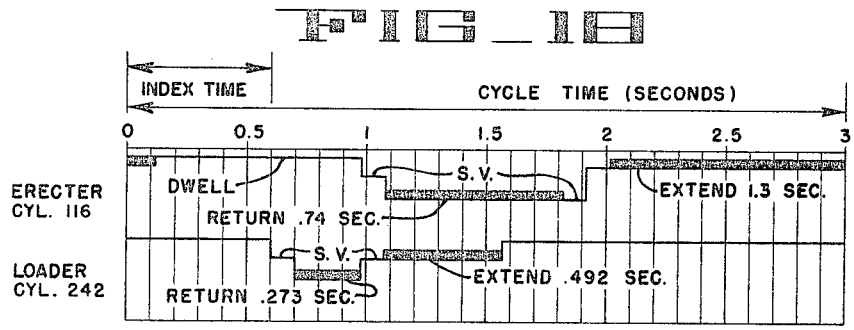
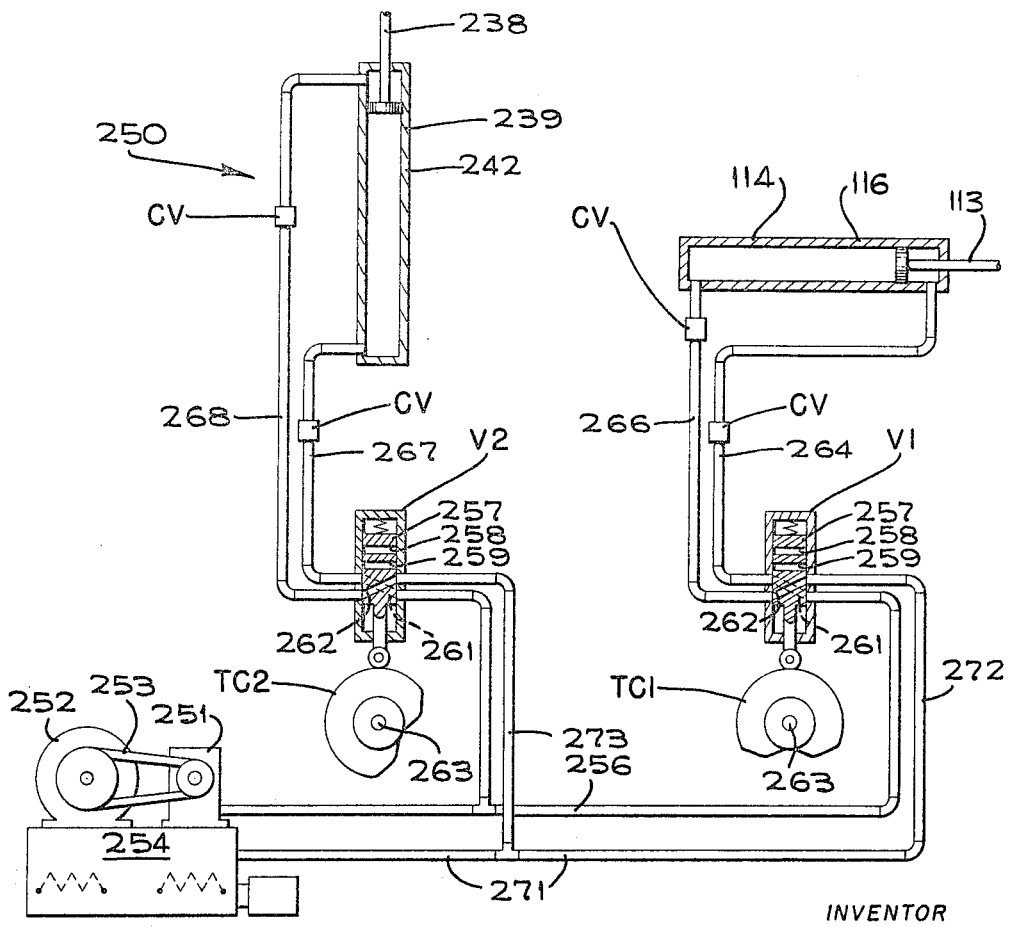
INVENTOR
LESLIE VADAS
BY *Hans G. Hoffmeister*
ATTORNEY United States Patent Office 3,269,279
Patented August 30, 1966

3,269,279
CARTON ERECTING AND LOADING APPARATUS
Leslie Vadas, Los Gatos, Calif., assignor to FMC Corporation, San Jose, Calif., a corporation of Delaware
Filed Oct. 21, 1963, Ser. No. 317,412
10 Claims. (Cl. 93—53)

The present invention pertains to packaging equipment and more particularly relates to apparatus for erecting an open ended tubular carton blank from a substantionally flat folded carton blank, and for inserting the tubular carton blank onto a mandrel.

In carton forming and filling machines of the type disclosed in the application for United States Letters Patent of Heffelfinger et al., Serial No. 216,248, filed August 10, 1962, flat folded carton blanks are placed in two rows or lines in upright positions in a magazine. The folded carton blanks are individually picked from each line by suction heads, are over-bent, and are then erected into tubular carton blanks of generally rectangular cross section. These tubular carton blanks are then pushed onto associated mandrels which are arranged in two circular series of an intermittently driven turret. Each series of mandrels is arranged to receive the cartons from an associated line of cartons in the magazine.

In order to improve the reliability of the above described type of erecting and loading apparatus and at the same time greatly simplify its construction and operation, it has been found that it is desirable that each squared carton or carton blank be positively ejected from the suction grippers of the suction head and that the means for guiding the carton during initial downward movement be made as small as possible to thereby reduce friction and accordingly reduce the forces tending to misalign the carton during its movement onto the associated mandrel. It has also been determined that independent control of vacuum at the suction heads associated with each line of cartons is desirable in order to permit reliable operation of one processing line in the event cartons are not in position to be gripped by the suction head in the other line, such as would occur if the portion of the magazine associated with the other line was empty or the cartons therein were jammed. It has also been determined that the carton blanks, after being squared and before being moved onto the associated mandrels, must be accurately positioned in their associated lines so that they can be reliably moved onto the associated mandrels.

It is, therefore one object of the present invention to provide an improved carton erecting and loading mechanism.

Another object is to provide a multiple row carton erecting and loading apparatus having independently adjustable suction heads.

Another object is to provide a carton erecting apparatus having means for positively ejecting squared carton blanks from their associated suction heads.

Another object is to provide a carton erecting and loading apparatus having means for guiding the squared carton blanks onto the associated mandrels.

Another object is to provide suction control means for controlling the vacuum at one suction head independently of the vacuum at the other head.

These and other objects and advantages of the present invention will become apparent from the following description and the accompanying drawings, in which:

FIGURE 1 is a plan of the carton erecting apparatus of the present invention shown associated with the magazine.

FIGURE 1A is a diagrammatic vertical section taken on line 1A—1A of FIG. 1.

FIGURE 2 is a transverse section of the carton erecting apparatus and a portion of the magazine taken substantially along lines 2—2 of FIGURE 1.

FIGURE 3 is an enlarged horizontal section taken along lines 3—3 of FIGURE 2.

FIGURE 4 is a perspective of a carton shown in the folded position that it assumes when in the magazine.

FIGURE 5 is a perspective of the carton when erected to form a tube having a rectangular section.

FIGURE 6 is an enlarged fragmentary elevation of a carton showing the points of engagement of the carton arresting fingers with the foremost carton when the carton is in a flat folded position.

FIGURE 7 is a diagrammatic plan showing various operating positions of the suction head.

FIGURE 8 is a perspective showing that portion of a carton erecting apparatus adapted to erect the cartons in one line, certain parts being cut away and others shown in section.

FIGURE 9 is a schematic horizontal section taken along lines 9—9 of FIGURE 8 illustrating a pair of valves and an actuating mechanism for independently controlling the vacuum to the suction heads.

FIGURE 10 is an enlarged horizontal section taken along lines 10—10 of FIGURE 8 illustrating the operative relationship between the suction head and its associated ejecting device.

FIGURE 11 is a diagrammatic plan showing the vacuum supply conduit system.

FIGURES 12 through 15 are operational views showing the progressive stages in the operation of the carton erecting apparatus.

FIGURE 16 is a schematic operational view showing the turret loading apparatus in two operative positions.

FIGURE 17 is a diagrammatic elevation illustrating the hydraulic system of the carton erecting and loading apparatus.

FIGURE 18 is a chart illustrating the timing of the hydraulic power unit used in the hydraulic system.

The apparatus of the present invention is particularly adapted for use with the machine disclosed in the above-identified Hefflelfinger et al. application and many parts of the present machine are identical to parts in the Hefflelfinger et al. machine. Accordingly, reference may be had to said application for a complete disclosure of any of said common parts which are not described in detail herein.

The carton erecting and loading apparatus 13 (FIGS. 1 and 2) of the present invention includes an erecting apparatus 14 and a loading apparatus 15, and is adapted for use with the type of carton forming and filling machine disclosed in the above mentioned Heffelfinger et al. application. This machine includes a turret 16 (FIG. 2) having a plurality of mandrels 17 of generally rectangular cross-section projecting radially outward therefrom. The mandrels 17 are secured in arcuately spaced relation on a shaft 18 which is intermittently driven in a counterclockwise direction as viewed in FIGURE 2. The mandrels 17 are arranged in two series spaced from each other along shaft 18 with one series of mandrels positioned so as to receive erected cartons from a first processing line L1 while the other series of cartons is arranged to receive the erected cartons from a second processing line L2.

The cartons C (FIGS. 4, 5, 6 and 7) in each line L1 and L2 are supported in the magazine 19 when in their flat folded condition illustrated in FIGURE 4, and each carton is individually gripped by one of two suction heads 20 of the carton erecting apparatus 14. The apparatus 14 removes each foremost carton from the associated line L1 or L2 of the magazine 19, folds each carton into an open ended tubular square as illustrated in FIGURE 5, and then the carton loading apparatus 15 pushes each carton downwardly onto an associated mandrel 17 of the turret 16.

Although the cartons C (FIGS. 4, 5 and 6) form no part of the present invention, a brief description of one of the cartons will be given to aid in the understanding of the operation of the apparatus of the present invention. Each carton includes four planar walls 21, 22, 23 and 24, which are connected together at longitudinal hinge lines 26 that are prescored to facilitate bending. The cartons are placed in abutting relation in the magazine in the upright position shown in FIG. 4 with the walls 21 and 22 of each carton in abutting relation, and with the walls 23 and 24 also abutting each other. When erected by the appartus of the present invention, the walls 21 and 24 are moved into parallel planes, and the walls 22 and 23 are also moved into parallel planes which are perpendicular to the walls 21 and 24. The lower edges of the front wall 21 is provided with a notch 27 which exposes a portion 28 of the wall 22, as indicated in FIGURE 4, when the cartons are in the magazine 19. Similarly, the upper edge 29 of the wall 22 extends above the upper edge 31 of the front wall 21 and exposes a portion 32 of the wall 22 when the cartons are in the magazine. The exposed portions 28 and 32 of wall 22 provide means which may be releasably gripped by a structure, soon to be described, to aid in erecting the carton and in releasably holding the foremost carton in the magazine.

Since the parts associated with lines L1 and L2 are in many cases identical, in the description to follow, equivalent parts in both lines will be given the same numerals.

More particularly, the carton erecting and loading apparatus 13 (FIGS. 1 and 2) comprises the magazine 19 which includes slide bars 36 and 37 upon which the cartons are supported, and guide bars 38 and 39 which prevent transverse movement of the cartons while in their assocated lines L1 or L2. Means (not shown) are provided to urge the series of upright cartons in lines L1 and L2 toward the carton erecting apparatus 14. In order to prevent the foremost cartons in lines L1 and L2 from being inadvertently pushed out of the magazine 19, a lower carton arresting finger 42 is secured in each line to a horizontal beam 43 of the frame 44 of the carton-erecting portion of apparatus 13 and releasably engages the portion 28 (FIGS. 4 and 6) of the associated carton wall 22 to releasably hold the lower end of the carton in position to be withdrawn from the magazine. Similarly, an upper carton arresting finger 47 is secured in each line to an upper horizontal beam 48 in position to engage the portion 32 of the associated carton wall 22 as indicated in FIGURE 6.

At its forward end, adjacent the magazine 19, the frame 44 has a carton-entrance structure which includes the lower and upper horizontal beams 43 and 48, FIGS. 1 and 1A, which are held in vertically spaced relation by vertical side members 49 and 51 that cooperate with an elongated, vertically extending central member 52 to define a wall 53 having two large rectangualr opening 54 and 56 therein through which collapsed cartons in the lines L1 and L2 pass during the erecting operation. The forward central member 52 also includes a portion 58 that projects downwardly below the beam 43. At its rearward end, the frame 44 is provided with a channel-shaped member 59 (FIG. 2) which is connected, as by bolting, to plates 61 and 62 (FIG. 1) which are in turn bolted to the side members 49 and 51, respectively. Thus, the frame 44 is in the form of a rigid, open box structure upon which the several operating components of the carton erecting and loading apparatus of the present invention are mounted. It will be understood that the frame 44 is suitably secured to the main frame of the carton former and filler.

As mentioned previously, the folded cartons in each line L1 and L2 are held from movement out of the magazine 19 by an associated lower carton arresting finger 42 and an upper carton arresting finger 47. In order to accurately position the folded cartons transversely of their direction of movement and to aid the arresting fingers in maintaining the cartons in the magazine 19 until they are individually removerd therefrom by the associated suction heads 20, vertically extending positioning plates 63 and 64 (FIGS. 1A and 3) are provided.

The positioning plates 63 and 64 associated with line L1 are bolted to the vertical members 49 and the central member 52, respectively. Shallow, inwardly directed flanges 66 on the plates 63 (FIGS. 2, 3, and 8) engage the adjacent side edge of the associated foremost folded cartons in lines L1 and L2, and prevent passage thereof until the width of the folded carton has been foreshortened sufficiently during the erecting operation to permit the cartons to be pulled free of the flanges 66. Grooves or recesses 67 (FIG. 2) are provided on the rear edge of each positioning plate 63 to assure that mechanical interference will not occur between the associated suction head 20 and the plate 63 during the erecting operation.

A vertically elongated carton guide 68 is bolted to the discharge edge of each positioning plate 64, and each guide 68 includes an inwardly directed flange 69 that has an abutment surface 71 and a guiding surface or corner 72. The abutment surface 71 engages the adjacent edge of the foremost carton to maintain the carton in the magazine and acts as a pivot point until such time as the carton is pulled past the flange 69 by the associated suction head 20. The adjacent edge of the carton then becomes seated against the guiding corner 72 which subsequently aids in guiding the squared carton downwardly onto the mandrel 17 positioned therebelow. The plates 63 and 64, and the carton guide 68 associated with line L2 are similarly arranged.

The two suction heads 20 of the carton erecting apparatus 14 are identical and are employed to remove the associated cartons from the magazine and to erect the cartons into tubular squares. Each suction head 20 (FIG. 2) is rotatably supported upon a pair of upwardly projecting pivot shafts 83 and are held from axial movement thereon by snap rings 83a. The upper end of each shaft 83 is connected by set screws to one end of an associated actuating arm 84. The other end of each arm is bifurcated and is secured to a shaft 86 which is journalled in the free end of an L-shaped bearing block 88 which is bolted to the frame member 48. Each shaft 86 has a pinion 89 keyed thereon, and the two pinions 89 of the suction head 20 associated with line L1 are disposed in meshing engagement with a segment 91 of a rack 92. As shown in FIGURE 1, the rack 92 includes another segment 93 which engages the two pinions 89 associated with the suction head 20 of line L2.

The rack segments 91 and 93 are bolted to a slide bar 96 which is slidably received within mating grooves 97 (FIG. 2) in slide blocks 98 that are bolted to the upper surface of the bearing blocks 88. An actuating arm 101 is rigidly secured to an upper extension of one of the shafts 86 of the head associated with line L1, which extension is journalled in a bearing bracket 103 bolted to the slide block 98.

In order to swing each suction head 20 between a carton receiving position R (FIG. 7), an over-bending position OB, and a carton discharging position D, the actuating arm 101 is connected to one end of an adjustable linkage 106. The adjustable linkage 106 is of the turnbuckle type and includes a central portion 107 (FIG. 1) which may be screwed in either direction to shorten or lengthen the linkage thereby providing means for varying the arcuate range through which each suction head 20 swings. The other end of the adjustable linkage 106 is pivotally secured to one end of an actuating arm 108 which is rigidly secured to the upper end of an actuating shaft 109. The actuating shaft 109 is journalled in spaced bearing blocks 111 (FIG. 8) which are bolted to the wall 61. An actuating arm 112 is keyed to the shaft 109 and is pivotally connected to the piston rod 113 of a hydraulic power unit 114. The hydraulic power unit 114 includes a cylinder 116 which is pivotally connected to a bracket 117 secured to the rear wall of channel-shaped frame member 59, as clearly illustrated in FIGURE 8.

Since the material from which the cartons are made is somewhat stiff and resists bending, it is desirable that these cartons be overbent so as to reduce the tendency of the cartons to return to their folded positions. Thus, as the piston rod 113 is retraced into the cylinder 116 from its extended position shown in FIGURE 8, the suction heads 20 are first moved clockwise from the discharge position D (FIG. 7) to the overbending position OB, and then counterclockwise through position D to the carton gripping or receiving position R and into engagement with the foremost carton in the magazine. Each suction head 20 then grips the associated foremost carton and upon movement of the piston rod 113 toward the extended position, pulls it free from the arresting fingers 42 and 47 and from the flanges 66. Continued movement of the piston rod 113 toward the extended position causes the suction head 20 to move clockwise (FIG. 7) beyond the discharge position D into the overbending position OB and then return to the discharge position D as the piston rod 113 completes its movement to the extended position. In this way, the carton is overbent and some of the natural resilience present in the hinge lines 26 of the carton is reduced so that the tendency of the carton to return to is folded position is not excessive.

It will be appreciated that the arcuate range through which each suction head 20 swings must be accurately controlled so that the suction heads 20 in lines L1 and L2 will be in proper position to grip the cartons when the piston rod 113 is in its retracted position, and will be in proper position to discharge the cartons when the piston rod is in the extended position. Accordingly, it is an important feature of the present invention to provide means for adjusting the swing of the suction head 20 associated with line L2 independently of the swing of the suction head 20 associated with line L1.

In order to provide independent control over the arcuate range of travel of the suction head 20, in line L2, the two rack segments 91 and 92 (FIGS. 1 and 9) are interconnected by a turnbuckle 118. The rack segment 93 is connected to the slide bar 96 by cap screws 119 (FIG. 1) which extend through slots 120 in the bar 96 and are screwed into the rack segment 93. Thus, when it is desired to adjust the suction head 20, associated with line L2, relative to the suction head 20 associated with line L1, the cap screws 119 (FIG. 1) are loosened, the adjustment is made by screwing the turnbuckle 118 in the proper direction, and the segment 93 is locked in adjusted position by tightening the cap screws and by locking the turnbuckle in place by means of lock nuts 118a. If it is desired to simultaneously make adjustments in the arcuate range of both suction heads 20, these adjustments can be made by turning the central portion 107 of the adjustable linkage 106 in the proper direction and thereafter locking the portion 107 in the adjusted position by lock nuts 107a.

Each suction head 20 (FIG. 2, 8 and 10) comprises a body 126 having a plurality, preferably five, suction cups 127 mounted thereon. The five cups may be positioned to provide a lower side-by-side pair (FIG. 10), a central pair above the lower pair, and a top cup shown in FIG. 2. Passages 128 formed in the body 126 establish communication between all of the suction cups 127, and a passage 129 (FIG. 2) in an adapter 131 which is bolted to the body 126 and is inclined upwardly and rearwardly therefrom. Flexible conduits 132 and 133 of a vacuum supply system 134 (FIG. 11) soon to be described, are connected to the passages 129 in the adapters 131 associated with lines L1 and L2, respectively.

After the foremost carton in each line has been gripped and moved to the discharge station D in the manner previously described, the cartons are positively ejected from the suction cups 127 and are guided downwardly during the subsequent loading operation. Accordingly, each suction head 20 includes a vacuum operated ejecting device 135 (FIGS. 2, 8 and 10) which comprises a diaphragm motor 136 that moves a carton ejecting and guiding head 137 (FIG. 10) between an operative carton ejecting and carton guiding position, and a position in which the ejecting surface of the head 137 is withdrawn from the carton. The diaphragm 136 is clamped to a bracket 139 which is bolted to the body 126 of the associated suction head 20.

The diaphragm motor 136 as illustrated in FIGURE 10, comprises a pair of dish shaped housing members 142 and 143 having a flexible resilient diaphragm 144 disposed therebetween. The outer peripheral edges of the diaphragm 144 and the outer peripheral edges of the members 142 and 143 are connected together in fluid tight relation by screws 146 to define a vacuum chamber 147 and an air chamber 149. The diaphragm 144 is reinforced near its mid-point by discs 151 and 152 which are arranged in clamping engagement with the diaphragm by threading a reduced diameter end portion 153 of a push rod 154 into the disc 152. The push rod 154 is slidably received in a collar 156, secured to the member of 142, and has the ejecting head 137 secured to the free end thereof as by set screws 157. A spring 158 disposed between the disc 152 and the dish shaped member 143 normally urges the push rod 154 to the active position, that is, toward the left to the position shown in FIGURE 10. Engagement of the disc 151 with the collar 156 limits the above movement of the push rod.

The vacuum chambers 147 of the diaphragm motor 136 of the two heads 20 are connected to the vacuum supply control system 134 (FIG. 11) by flexible conduits 161 and 162, respectively. Upon connecting the vacuum chambers 147 of each motor 136 to a source of vacuum, the resilience of the spring 158 (FIG. 10) is overcome by the unbalanced pressure acting on the diaphragm due to atmospheric air entering the air chamber 149 through a vent 163, and the low pressure atmosphere in the vacuum chamber 147. Thus, when the vacuum is applied, each ejecting head 137 is moved to the retracted position.

A bracket 164 (FIG. 10) is bolted to each body 126, and each bracket has a collar 166 formed thereon which guides the associated ejecting head 137, which is preferably nylon, as it moves between the active and retracted positions. When in the active position, a portion of a flat annular ejecting surface 167 of the head 137 engages the front carton wall 21 (FIG. 3) of the carton. A small diameter button or guide pin 168 of the head 137 projects outwardly from the surface 167 and defines an abutment surface disposed in guiding relation with the wall 22 of the carton C as indicated in FIGURE 3. Thus, it is an important feature of the present invention that when a carton C has been erected as indicated in FIG. 3 and the vacuum is released, each ejecting head 137 positively ejects the associated carton from the suction cups 127. Another important feature is that the head 137 provides guiding surfaces against which one corner of the carton rests and is retained by resilience in the carton during downward movement of the squared carton onto the mandrel 17 positioned therebelow. At the beginning of the loading operation, one corner of the carton is guided solely by the ejecting head 137 while the opposed corner of the cartoon is guided by the aforementioned guiding surface 72 of the carton guide 68.

In order to operate the vacuum supply control system 134 in timed relation with the movement of the suction heads 20, a cam 174 (FIGS. 8 and 9) having adjacent camming surfaces 176 and 177 thereon, is keyed to the actuating shaft 109 and is disposed between arms 178 and 179 in the forked end of a valve actuating lever 181. Adjustment bolts 182 and 183 (FIG. 9) are screwed into the arms 178 and 179, respectively, in positions to engage the camming surfaces 176 and 177, respectively. When the shaft 109 is rotated counterclockwise (FIG. 9) and approaches the limit of its movement, the bolt 182 is engaged by the surface 176, causing the lever 181 to pivot counterclockwise, and when the shaft 109 is rotated clockwise and approaches its limit of movement, the bolt 183 is engaged by the camming surface 177 causing the lever 181 to pivot clockwise. The lever 181 is pivotally connected to the upper bearing block 111 by a cap screw 185 and has its other end pivotally connected to a yoke 185a which is connected to the core 184a or 186a of one of two vacuum control valves 184 and 186 of the vacuum supply control system 134.

As shown in FIGURE 9, the cores 184a and 186a are interconnected by a strap 188 thereby causing both cores to be actuated simultaneously in response to movement of the lever 181. Each core includes a straight passage 189 and an inclined passage 191 and is held in adjusted position by a ball detent 192 selectively receivable in either of two grooves formed in the core. When the core 184a of the valve 184 is position as shown in FIGURE 9, the straight passage 189 of valve 184 registers with a port leading to a vent conduit 196 and with a port leading to a main supply conduit 197 which includes a pipe T 198 (FIG. 11). One outlet port of the T 198 is connected by the flexible conduit 161 to the vacuum chamber of the diaphragm motor 136 in line L1. The other outlet of the T 198 is connected to a solenoid operated valve 201 by a conduit 202, and the previously mentioned flexible conduit 132 is connected between the valve 201 and the passage 129 in the adapter 131 which communicates with the suction cups 127 in line L1. Thus, when the core 184a of the valve 184 is in the position shown in FIGURE 9, the suction cup 127, and the vacuum chamber of the diaphragm 136 in line L1 are vented to the atmosphere. When the core 184a of the valve 184 is shifted to the inclined passage position, the inclined passage 191 registers with the main supply conduit 197 and with a conduit 204 connected to a source of vacuum (not shown) thereby simultaneously applying suction to the suction cups 127 in line L1 and actuating the diaphragm motor 136 in line L1 to move the ejecting head 137 to the inoperative position.

Similarly, when the core 186a of the valve 186 is as shown in FIGURE 9, the straight passage 189 of valve 186 registers with a vent conduit 211 (FIG. 11) and with a main supply conduit 212 which includes a pipe T 213. The previously mentioned flexible conduit 162 is connected between the diaphragm motor 136 in L2 and with one outlet port of the T 213. The other outlet port of the tee 213 is connected to a solenoid operated valve 214 by a conduit 216. The previously mentioned flexible conduit 133 is connected between the valve 214 and passage 129 in adapter 131 thereby establishing communication with the suction cups 127 in line L2. Thus, the suction cups 127 and the diaphragm motor 136 associated with line L2 are vented to the atmosphere when the core 186a is positioned as shown in FIGURE 9.

When the core 186a is shifted to the inclined passage position, the inclined passage 191 registers with the main supply conduit 212 and with a conduit 219 connected to a source of vacuum (not shown) thereby simultaneously activating the diaphragm motor 136 in line L2 and applying suction to the suction cups 127 in line L2. This causes the suction cups 127 to grip a carton and causes the ejecting head 137 to move to the retracted position.

An important feature of the present invention is that the valves 184 and 186 independently control the actuation of the vacuum operated components of the vacuum heads 20 in line L1 and L2, and accordingly, are connected by separate conduit systems to their associated heads 20 and to a source of vacuum which is ample to supply adequate vacuum to both suction heads 20 even though the suction cups 127 of one head may be open to the atmosphere.

In the event it is desirable to operate either or both lines L1 ant L2 of the carton erecting apparatus 14 without gripping cartons, one or both of the solenoid valves 201 and 214 are closed in response to the closing of manually operated switches (not shown) which may be positioned on the control panel of the machine as described in the Heffelfinger et al. application. For example, at the end of the days run, when it is desired to clear the machine of cartons, both solenoid valves 201 and 214 are closed and the machine is operated until all previously erected cartons have passed through the machine. It will be appreciated however, that during this time the diaphragm motors 136 continue to operate in the usual manner.

After a carton in each line L1 and L2 has been erected as above described, the cartons are loaded onto the mandrels 17 (FIG. 2) positioned therebelow by the loading apparatus 15. The loading apparatus 15 (FIGS. 1, 2, 3 and 8) comprises a transversely extending pusher support 226 having a U-shaped portion 227 for accommodating the suction head mounting shafts 83 associated with the suction head 20 in line L2 when this head is in the carton pick-up position. A carton engaging shoe 228 is bolted to each end of the pusher support 226, and each shoe 228 includes a pair of slots or recesses 229 and 231 disposed at different elevations and arranged to engage the upper edges 29 and 31 of the walls 22 and 23, respectively, of the associated carton, which edges are at different elevation as clearly indicated in FIGURE 8.

The pusher support 226 is secured to a bracket 233 (FIG. 2) which is welded to a sleeve 234 mounted for vertical reciprocal movement on a vertical shaft 235. The shaft 235 is secured at its opposite ends to the central member 52 of the frame 44. As best shown in FIGURES 2 and 3, a stub shaft 236 is welded to the sleeve 234 and has a cam follower 237 and the piston 238 of a hydraulic power unit 239 journalled thereon. The cam follower 237 is positioned in a cam track 241 (FIG. 3) formed in the central frame member 52 and serves to prevent rotation of the sleeve 234. The lower end (not shown) of the cylinder 242 of the power unit 239 (FIG. 2) is anchored to the frame in any suitable manner.

When the piston rod 238 is in its extended position as shown in FIGURE 2, the pusher support 226 and shoes 228 are positioned above the erected cartons in lines L1 and L2. Upon retraction of the piston rod 238 into the cylinder 242, the shoes 228 engage the upper edges of the cartons and force them downwardly. During the initial portion of the downward movement, each carton is guided by the associated guiding surface 72 (FIG. 3) and by the ejecting and guiding head 137. Upon further downward movement, the lower end of the carton passes between a pair of cooperating U-shaped guides 243 and 244 which are secured to the frame 44 and serve to guide each carton onto the mandrel 17 positioned therebelow.

The hydraulic control system 250 (FIG. 17) which operates the hydraulic power unit 114 of the carton opening mechanism and the power unit 239 of the carton pushing mechanism in timed relation with each other and in timed relation with the intermittent movement of the turret 16, is similar to that disclosed in the Heffelfinger et al. application. The hydraulic control system 250 (FIG. 17) comprises a hydraulic pump 251 which is driven from a motor 252 through a belt drive 253. The pump 251 draws hydraulic fluid from a sump 254 and directs it through a high pressure conduit 256 to a pair of four-way valves V1 and V2. The valves V1 and V2 are identical and each valve includes a core 257 having parallel passages 258 and 259, and cross passages 261 and 262 therein. The valves V1 and V2 are shifted from the parallel passage positions to the cross passage positions by timing cams TC1 and TC2 which are keyed to a common timing shaft 263 that is driven in timed relation with the turret 16 one revolution of shaft 263 for each cycle of operation of the carton erecting and loading apparatus. Conduits 264 and 266 are connected between the valve V1 and the opposite ends of the hydraulic cylinder 116 of the power unit 114. Similarly, conduits 267 and 268 are connected between the valve V2 and the opposite ends of the cylinder 242 of the hydraulic power unit 239. Speed control valves CV, of the type disclosed in the above-mentioned Heffelfinger et al. application, are provided in each of the conduits 264, 266, 267 and 268 and control the rate of movement of the pistons 113 and 238 in accordance with that shown in the timing diagram of FIGURE 18. Hydraulic fluid discharged from the power units 114 and 239 is returned to the sump 254 through a low pressure conduit 271, and branch conduits 272 and 273 connected between the conduit 271 and the valves V1 and V2, respectively.

Although the operation of the carton erecting and loading apparatus 13 of the present invention has been included in the description of the components of the apparatus 13, a brief resume of the operation will follow. In regard to the timing diagram shown in FIGURE 18, it will be understood that the darkened horizontal lines indicate the time required for the piston rods of the carton-erector cylinder 116 and of the carton-pusher cylinder 242 to move from the extended to the retracted positions, or from the retracted to the extended positions. The narrow horizontal lines indicate the dwell periods during which pressure is continued to be applied to the same sides of the pistons after movement is completed until such time as the associated timing cam TC shifts the associated valve V1 or V2 to its other position. The lines marked S.V. correspond to the sloping portions of the associated cams, which portions shift the valves V1 and V2 between the cross-passage position and the straight-passage position. The time required for the valves to shift from one position to the other will not be included in the description to follow, but, as shown in FIGURE 18, each shifting of the valves requires approximately 0.1 second.

As indicated at the top of FIGURE 18, the turret indexing operation takes place during the first 0.6 second of each three-second cycle of operation, and during the remaining time the turret is stationary.

At the start of the cycle of operation, the piston rod 113 of the power unit 114 is terminating its movement toward the extended position. High pressure fluid at this time flows through the high pressure conduit 256, through the cross-passage 261 in the valve V1, through the conduit 264, into the closed end 116A of the cylinder 116 of the power unit 114. Fluid in end 116B of the cylinder is discharged through the conduit 266 and speed control valve CV therein, through the passage 262, and returns to the sump 254 through conduits 272 and 271.

As indicated in FIGURE 18, movement terminates after approximately 0.12 second and the piston rod 113 remains in the extended position until approximately 0.98 second after the beginning of the cycle of operation. During this time, each suction head 20 is in the loading position as indicated in solid lines in FIGURE 12, and the ejecting and guiding head 137 is in the extended position.

The timing cam TC1 then shifts the valve V1 to the parallel passage position wherein high pressure hydraulic fluid is directed to end 116B of the cylinder 116. At this time, high pressure fluid flows from the conduit 256, through the passage 259 in the valve V1, through the conduit 266, and into the end 116B of the cylinder 116. Fluid is discharged from end 115A of the cylinder 116 through the conduit 264 and speed control valve CV therein, through the passage 258 in the valve V1, through the conduit 272, and returns to the sump 254 through a conduit 271. The speed control valve CV in conduit 264 is regulated to cause the piston to move to the retracted position in approximately 0.74 second and to dwell in this position for an additional 0.10 second.

During this interval, each head 20 first swings to the dotted line or overbending position OB shown in FIGURE 12 and then moves into the carton receiving position R shown in FIGURE 13. As the piston rod 113 reaches its retracted position, the cores 184a and 186a (FIG. 9) of the vacuum controls valves 184 and 186 are shifted to positions causing vacuum to be applied to the suction cups 127 and to the diaphragm motors 136 thereby causing the cartons to be gripped and causing the ejetcing and carton guiding heads 137 to be moved to their retracted positions. It will be noted in FIG. 13 that a corner of the carton is positioned against a cylindrical surface of pin 168 but is spaced from the annular surface 167 of the ejecting head 137 at this time.

With each foremost carton gripped and secured to the associated suction head 20, the timing cam TC1 returns the valve V1 to the cross-passage position causing the piston rod 113 to move to the extended position. During this movement, each suction head 20 first moves to the overbending position indicated in FIGURE 14 thereby substantially reducing the resilience in the hinge lines 26 of the gripped cartons, which resilience would otherwise apply an excessive force tending to return the carton to the flat folded condition.

At the completion of the movement of the piston 113 to the extended position, which movement does not terminate until after the next cycle of operation begins, each suction head 20 is positioned at the discharge station as shown in FIGURE 15. While in this position, the supply of vacuum to the suction cups 127 and to the diaphragm motor 136 is discontinued. This causes the suction cups 127 to release their grip on the cartons, and causes the ejecting and guiding head 137 to move into the ejecting and guiding position illustrated in FIGURE 15 with one corner of the carton bearing against the guide pin 168 and annular surface 167 of the head 137. It will be noted that the opposite edge of the carton slidably engages the guiding surface 72 of the carton guide 68.

With each carton erected as above described, and supported by the surface 72 and the ejecting and guiding head 137, the erected carton is moved downwardly during the next cycle of operation onto the mandrel 17 positioned therebelow by the loading apparatus 15.

At the beginning of a cycle of operation, the piston rod 238 of cylinder 242 is in its extended position and the carton engaging shoes 228 (FIG. 16) are held in their elevated positions above the erected cartons in lines L1 and L2. At the beginning of the cycle, high pressure fluid from the conduit 256 is directed through the passage 261 in valve V2 and through conduit 267 into the lower end of the cylinder 242 of the power unit 239. Fluid in the upper end of cylinder 242 has previously been discharged through the conduit 268 and the speed control valve CV therein, through conduits 273 and 271 to the sump 254. The piston rod 238 remains extended for approximately 0.6 second after the start of the cycle permitting the mandrels 17 to be indexed below the erected cartons in lines L1 and L2. The timing cam TC2 then shifts the valve V2 to the parallel passage position. When in this position, high pressure fluid flows from the conduit 256, through the passage 259 in the valve V2, through conduit 268, and into the upper end of the cylinder 242 thereby moving the piston rod to the retracted position. The fluid in the lower end of the cylinder 242 is discharged through the conduit 267 and through the speed control valve CV therein, through the passage 258 in valve V2, and is returned to the sump 254 through conduits 273 and 271. The speed control valve CV in line 267 is regulated to cause the downward movement to occur in approximately 0.273 second. During this time, each carton is engaged by the associated shoe 228 (FIG. 16) and is pushed downwardly, being guided during the initial portion of the movement solely between the surface 72 and the ejecting and guiding head 137. Upon further downward movement, the carton is engaged between and is guided by the U-shaped guides 243 and 244 onto the mandrel 17 positioned therebelow as indicated in dotted lines in FIGURE 16.

The timing cam TC2 then returns to the valve V2 to the cross passage position and the hydraulic fluid passes through previously described passages to return the piston rod 238 to the extended position in approximately 0.492 second. The piston rod remains in the extended position for the remainder of the cycle and until after the beginning of the next cycle of operation.

From the foregoing description it will be apparent that the carton erecting and loading apparatus of the present invention utilizes a combination vacuum operated carton ejecting and guiding head which is simple in design and in operation and reliably functions to first separate the erected carton from the associated suction head, and thereafter guide the carton onto a mandrel. The apparatus also includes an improved system for controlling the vacuum applied to each suction head individually, and includes apparatus for accurately adjusting the position of one suction head relative to the other.

While one embodiment of the present invention has been shown and described, it will be understood that various changes and modifications may be made therein without departing from the spirit of the invention or the scope of the appended claims.

Having thus described the invention, what is claimed as new and desired to be protected by Letters Patent is:

1. Apparatus for erecting a carton and for loading the erected carton onto a mandrel comprising, means for supporting a carton in a flat folded position, erecting means for gripping and swinging the carton from the support means into endwise alignment with the mandrel and for erecting the carton into an open-ended tube of rectangular cross-section, means for engaging said carton and for moving said carton onto the aligned mandrel, stationary guide means slidably engaging one corner of said erected carton, movable guide means supported by said erecting means, and means for moving said movable guide means into position to eject the carton from said erecting means and to slidably engage that corner of said carton which is diagonally opposed from said first mentioned corner for guiding said carton as it moves onto said mandrel.

2. An apparatus for erecting a carton and for loading the erected carton onto a mandrel comprising, means for supporting a carton in a flat folded position, a suction head having a suction cup thereon, means mounting said suction head for movement from a carton receiving position to a carton discharging position in endwise alignment with the mandrel, stationary guide means slidably engaging one corner of said erected carton, movable ejecting and guiding means supported by said suction head, a diaphragm motor connected to said ejecting and guiding means and arranged to move said ejecting and guiding means into position to eject the carton from said suction cup and to slidably engage a corner of said carton which is diagonally opposed from said first mentioned corner for guiding said carton as it moves onto said mandrel, means for applying vacuum to said suction head and to said diaphragm motor, and control means for controlling the supply of vacuum so that said suction cup will grip the carton and said ejecting means will move to a retracted position when the suction head is swinging from the carton receiving position to the carton discharging position, said control means being adapted to discontinue application of vacuum to said suction cup and to said diaphragm motor to cause said motor to effect movement of said ejecting means into position to eject the carton from said suction cup and to move into said guiding position.

3. An apparatus for erecting a carton and for loading the erected carton onto a mandrel comprising, means for supporting a carton in a flat folded position, erecting means for gripping and swinging the carton from said support means into an overbending position to reduce the resilience in said carton and thereafter into endwise alignment with the mandrel with the carton erected into an open-ended tube of rectangular cross-section, means for engaging said carton and for moving said carton onto the aligned mandrel, stationary guide means slidably engaging one corner of said erected carton, movable guide means supported by said erecting means, and means for moving said movable guide means into position to eject the carton from said erecting means and to slidably engage that corner of said carton which is diagonally opposed from said first mentioned corner for guiding said carton onto said mandrel.

4. In an apparatus for erecting a carton and for loading the erected carton onto a mandrel, the combination of means for supporting a carton in a flat folded position, erecting means for gripping and swinging the carton from said support means into alignment with the mandrel and for erecting the carton to form a tube of rectangular cross-section, stationary guide means for engaging one corner of said carton, movable guide means supported by said erecting means, and means for moving said movable guide means into position to eject the carton from said erecting means and for engaging that corner of said carton which is diagonally opposed from said first mentioned corner.

5. In an apparatus for erecting a carton and for loading the erected carton onto a mandrel, the combination of means for supporting a carton a flat folded position, erecting means for gripping and swinging the carton from said support means into an overbending position to reduce the resilience in said carton and there after into alignment with the mandrel with the carton erected into a tube of rectangular cross-section, stationary guide means slidably engaging one corner of said erected carton, movable ejecting and guiding means supported by said erecting means, and means for moving said ejecting and guiding means into position to eject the carton from said erecting means and to slidably engage and support that corner of said carton which is diagonally opposed from said first mentioned corner.

6. In an apparatus for erecting a carton and for loading the erected carton onto a mandrel, the combination of means for supporting a carton in a flat folded position, a suction head, means for swinging the suction head between a carton gripping position wherein the carton is gripped and removed from said support means and a carton discharging position wherein said carton is positioned in alignment with the mandrel, a suction cup on said suction head adapted when activated to engage one face of the carton and hold it in a predetermined plane, an ejecting and guiding head mounted on said suction head for reciprocable movement in a direction toward and away from said plane, said ejecting and guiding head including an ejecting surface parallel to said plane and a guiding button between projecting outwardly of said ejecting surface, actuating means connected to said ejecting and guiding head for moving said ejecting surface between a retracted position spaced from said face of the carton and an extended ejecting position engaging said face and moving said face away from said plane with said button contacting one edge of said face, and control means for activating said suction cup and said actuating means for gripping said face and for moving said surface to the retracted position when said suction head is swinging from said carton gripping position to said carton discharging position, said control means being arranged to activate said suction cup and said actuating means when said suction head is at said discharge position to cause said cup to release said face and to cause said ejecting surface to engage said face and move it out of said plane.

7. In an apparatus for erecting a carton and for loading the erected carton onto a mandrel, the combination of means for supporting a carton in a flat folded position, a suction head, means for swinging the suction head between a carton gripping position wherein the carton is gripped and removed from said support means and a carton discharging position wherein said carton is erected and positioned in alignment with the mandrel, a suction cup on said suction head adapted when activated to engage one face of the carton and hold it in a predetermined plane, an ejecting and guiding head mounted on said suction head for reciprocable movement in a direction toward and away from said plane, said ejecting and guiding head including an ejecting surface parallel to said plane and a guiding button projecting outwardly of said ejecting surface, a diaphragm motor connected to said ejecting and guiding head for moving said ejecting surface between a retracted position spaced from said face of the carton and an extended ejecting position engaging said face and moving said face away from said plane with the button contacting one edge of said face, and control means for activating said suction cup and said diaphragm motor for gripping said face and for moving said surface to the retracted position when said suction head is swinging from said carton gripping position to said carton discharging position, said control means being arranged to deactivate said suction cup and said diaphragm motor when said suction head is at said discharge position to cause said cup to release said face and to cause the ejecting surface to engage said face and move it out of said plane.

8. In an apparatus for erecting cartons and for loading the cartons onto mandrels, the combination of means for supporting a pair of open ended tubular cartons in flat folded positions, a pair of suction heads, means including a pair of pivot shafts mounting each head for swinging movement between a carton gripping position and a carton discharging position, means for swinging one of said heads through an arcuate range between said positions, a rack segment disposed in meshing engagement with each pinion, means slidably supporting said rack segments, and an adjustment means interconnecting said rack segments whereby the other suction head is swung through an arcuate range corresponding to the arcuate range of said one head and whereby the range of said other head may be changed while maintaining the range of said one head constant.

9. In an apparatus for erecting cartons and for loading the cartons onto mandrels, the combination of means for supporting a pair of cartons in flat folded positions, a pair of suction heads, means including a pair of pivot shafts mounting each head for swinging movement between a carton gripping position and a carton discharging position, means for swinging one of said heads through an arcuate range between said positions, a pinion secured to each pivot shaft, a rack segment disposed in meshing engagement with each pinion, means slidably supporting said rack segments, and a turnbuckle interconnecting said rack segments whereby the other head is swung through an arcuate range corresponding to the arcuate range of said one head and whereby the range of said other head may be changed while maintaining the range of said one head constant.

10. In an apparatus for erecting cartons and for loading the cartons onto mandrels, the combination of means for supporting a pair of open ended tubular cartons in flat folded positions, a pair of suction heads, means for swinging said suction heads between carton gripping positions wherein the cartons are gripped and removed from said support means and carton discharging positions wherein said cartons are positioned in alignment with associated mandrels, a suction cup on each of said suction heads, means for applying suction to said suction heads, and control means for independently controlling the suction applied to each of said suction heads during said gripping operation whereby one carton may be gripped and removed from said supporting means in the event the other carton is improperly positioned and the associated suction cup is open to the atmosphere.

References Cited by the Examiner
UNITED STATES PATENTS

| | | | |
|---|---|---|---|
| 2,887,021 | 5/1959 | Duffy et al. | 93—53 |
| 3,062,106 | 11/1962 | Pearson et al. | 93—53 |
| 3,064,542 | 11/1962 | Terry | 93—53 XR |
| 3,212,413 | 10/1965 | Allen et al. | 93—44.1 |

BERNARD STICKNEY, *Primary Examiner.*